United States Patent [19]

Flickner

[11] Patent Number: 5,410,222
[45] Date of Patent: Apr. 25, 1995

[54] SAMPLE PULSE GENERATOR FOR AUTOMATIC KINESCOPE BIAS SYSTEM

[75] Inventor: Andrew K. Flickner, Indianapolis, Ind.

[73] Assignee: Thomson Consumer Electronics, Inc., Indianapolis, Ind.

[21] Appl. No.: 114,866

[22] Filed: Aug. 31, 1993

[51] Int. Cl.$^6$ .............................................. H01J 29/52
[52] U.S. Cl. ...................................... 315/383; 348/379
[58] Field of Search ............................ 315/383; 348/379

[56] References Cited

U.S. PATENT DOCUMENTS 4,263,622  4/1981  Hinn ..................................... 358/242
4,694,350  9/1987  Hinn .

Primary Examiner—Theodore M. Blum
Attorney, Agent, or Firm—Joseph S. Tripoli; Peter M. Emanuel; Richard G. Coalter

[57] ABSTRACT

Control circuitry, in an AKB sample pulse generator, enables charging of a capacitor upon initiation of a vertical retrace pulse, initiates discharge of the capacitor in response to termination of the retrace pulse and concurrently produces an AKB output pulse having a width (W) determined by an RC time constant and having a delay time (Td) relative to initiation of the retrace pulse that is equal to the length (L) of the retrace pulse and that is independent of the value of the RC time constant. Advantageously, the AKB sample pulse delay time tracks variations, if any, of the retrace pulse and is unaffected by parameter variations of the RC components. Additionally, the sample pulse width can be controlled with analog simplicity and can be increased, for the same amount of overscan as compared with systems in which both pulse delay and width exhibit component sensitive delay times, thereby providing improved AKB control accuracy due to the increased "aperture" or sampling time.

4 Claims, 2 Drawing Sheets

SAMPLE PULSE GENERATOR FOR AUTOMATIC KINESCOPE BIAS SYSTEM

FIELD OF THE INVENTION

This invention relates to television systems generally and particularly to timing signal generators for generating timing pulses for use in automatic kinescope bias (hereafter, "AKB") control systems.

BACKGROUND OF THE INVENTION

Television receivers and monitors sometimes employ an automatic kinescope bias control system for automatically establishing proper black image representative current levels for each electron gun of the kinescope. As a result of this operation, pictures reproduced by the kinescope are prevented from being adversely affected by variations of kinescope operating parameters which may be caused, for example, by component aging or by component sensitivity to changes in temperature.

A conventional AKB control system includes a current sampling resistor in a kinescope cathode driver amplifier which is coupled to a control amplifier in an AKB feedback control loop for automatically adjusting the kinescope black level. Generally, this is done by sampling the kinescope drive level during a retrace interval, comparing the sample with a reference level and applying a correction current to the driver amplifier in a sense to adjust the black level to a desired reference value. If one employs RC timing elements to generate samples pulses having a given width determined by one time constant and having a delay relative to the retrace pulse determined by another RC time constant, then there may be an undesirable tendency for pulse errors to accumulate due to the use of multiple time constants. Such errors may be caused, for example, by component variations with temperature, age, humidity, etc. and may require occasional readjustment to maintain proper pulse timing.

SUMMARY OF THE INVENTION

The present invention is directed to meeting the need for an AKB sample pulse generator having reduced sensitivity to component variations.

An AKB sample pulse generator in accordance with an aspect of the invention includes an input for receiving a vertical retrace pulse, a further input coupled to an RC timing circuit having a time constant less than the width of the vertical pulses and logic circuitry for enabling charging of a capacitor upon initiation of the retrace pulse, for initiating discharge of the capacitor in response to termination of the retrace pulse and for concurrently producing an AKB output pulse having a width (W) determined by the RC time constant and having a delay time (Td) relative to initiation of said retrace pulse that is equal to said length (L) of the retrace pulse and that is independent of the value of the RC time constant.

Advantageously, the AKB sample pulse delay time, being dependent only on the length of the vertical retrace pulse, effectively "tracks" or follows variations in the retrace pulse and so is unaffected by parameter variations of the RC components. A further advantage is that the sample pulse width may be controlled with "analog simplicity" and the pulse width may be increased (for the same amount of overscan as compared with systems in which both pulse delay and width exhibit component sensitive delay times) thereby providing improved AKB control accuracy due to the increased "aperture" or sampling time thus provided.

BRIEF DESCRIPTION OF THE DRAWING

The foregoing and further features of the invention are illustrated in the accompanying drawing wherein.

DETAILED DESCRIPTION

Figure 1:
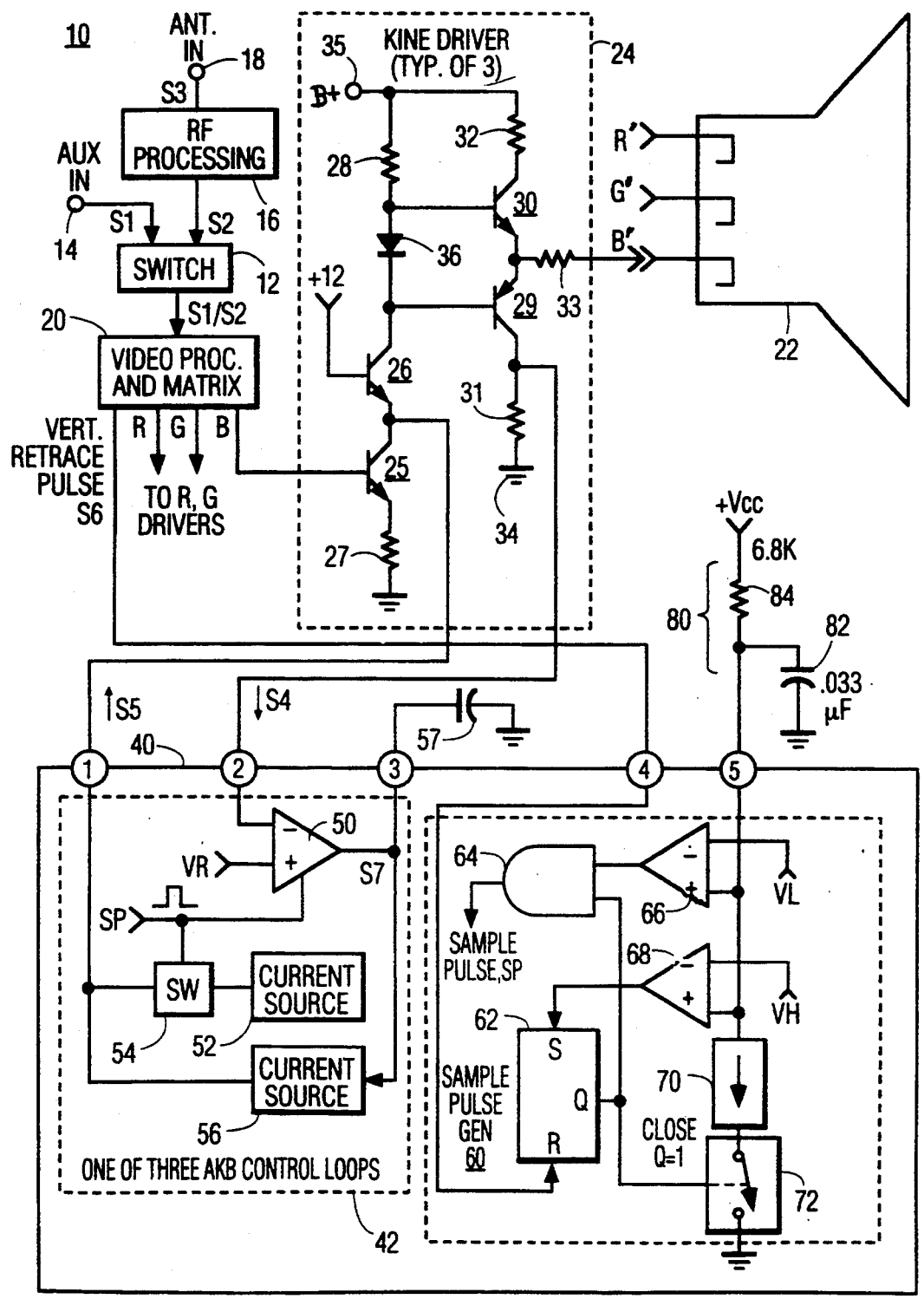
FIG. 1 is a block diagram, partially in schematic form, of an automatic kinescope bias (AKB) sample pulse generator used in a television receiver.

The television receiver 10 of the sole FIGURE includes a switch 12 for selecting a baseband video signal S1 provided by an auxiliary input terminal 14 or a baseband video signal S2 provided by an RF processing unit 16 having an antenna input terminal 18. Unit 16 may be of conventional design including, for example, a tuner, IF amplifier and video detector for converting the RF input signal S3 applied to terminal 18 to baseband form. The video signal (S1 or S2) selected by switch 12 is applied to a video processing and matrix unit 20 which produces component video signals RGB and a vertical retrace timing signal S6. Unit 20 may be of conventional design and may include, illustratively, color demodulation circuitry and control circuitry for hue, tint, brightness, as well as a matrix for generating the component color signals R (red), B (blue) and G (green).

The RGB color signals are applied to respective cathodes of a kinescope 22 for display by means of respective kinescope driver amplifiers. To simplify the drawing, only one kinescope driver amplifier (24) is illustrated. The kinescope 22 may be either of the direct view type having three cathodes within one tube (as shown) or it may be of the projection type which employs three separate kinescopes and an optical system for combining the respective images for display.

Kinescope driver amplifier 24 is of conventional design and includes a cascode connection of a common emitter connected input transistor 25 and a common base connected output transistor 26. The emitter of transistor 25 is coupled to ground via an emitter resistor 27 that, in combination with the load resistor 28 of transistor 26 determines the amplifier gain. A complementary PNP/NPN buffer amplifier couples the output signal of transistor 26 to the cathode of kinescope 22. Specifically, the conduction paths of PNP transistor 29 and NPN transistor 30 are coupled in series between ground 34 and B+ supply terminal 35. Resistors 31 and 32 in the collector circuits of transistors 29 and 30, respectively, provide current limiting. Resistor 31 additionally serves, for AKB purposes as a current sensing resistor as will be explained. To reduce cross-over distortion, a diode 36 is interposed between load resistor 28 and the collector of output transistor 26 to generate a 1 Vbe offset voltage between the bases of the complementary output transistors 29 and 30. This is not necessary, of course, of the output driver is "single-ended" rather than being of the "push-pull" or complementary emitter follower type as shown. Arc-over protection is provided by a resistor 33 coupled between the emitters of transistors 29 and 30 and the blue (B) cathode of kinescope 22. Additional protection may be provided by spark gaps if desired.

The current sensing resistor 31 is coupled to supply current samples S4 to an input pin 2 of an AKB integrated circuit 40 having an output pin 1 coupled to supply a correction current S5 to the emitter of the output transistor 26 of the kinescope driver amplifier 24 for adjusting the black level of the component signal B' supplied to the cathode of kinescope 22.

AKB integrated circuit 40 includes three AKB control loops (a typical one 42 of which is outlined in phantom) and a sample pulse generator 60. That portion of generator 60 that is formed on integrated circuit 40 is also outlined in phantom. To simplify the drawing, only one (42) of the control loops is shown. The other control loops are identical to loop 42 and are coupled to the respective red (R) and blue (B) kinescope driver amplifiers in the same manner as loop 42 is coupled to driver amplifier 24. The AKB control loop 42 comprises a keyed comparator amplifier 50 coupled to compare the current sample signal S4 with a reference voltage Vr for controlling a current source 56 that is coupled to pin 1 for supplying the correction current S5 to driver amplifier 24. Current adjustments are made during the vertical blanking interval of the video signal S1 (or S2) by in synchronism with sample pulses SP provided by sample pulse generator 60 as will be described in detail later. Specifically, in response to the retrace signal pulse S6 applied to pin 4, the sample pulse generator 60 generates a sample pulse SP at the end of the vertical retrace period which closes switch 54 thereby applying a sample reference current produced by current source 52 to the driver amplifier 24. This sample pulse represents a reference drive current and is used to determine the actual drive current to the kinescope. Sampling is done during the vertical interval at the end of the vertical retrace period in order to avoid interference from active (picture representative) video signals.

Amplifier 50, keyed by the sample pulse SP, determines if the kinescope cathode current S4 is above or below the value corresponding to reference voltage Vr and supplies a control signal S7 to current source 56 in a sense to adjust the kinescope black level to the desired level. The control signal (a voltage) S7 is smoothed by means of an integration capacitor 57 coupled to the output of amplifier 50 via integrated circuit pin 3.

To briefly summarize the operation described thus far, the control loop 42 in integrated circuit 40 will reach an equilibrium or "steady-state" condition in which the correction current S5 supplied to driver amplifier 24 will be just sufficient to maintain the black level drive for kinescope 22 at a level determined by the reference voltage Vr applied to the amplifier 50. The feedback in this control loop is negative and so counteracts any tendency for an undesired change in the black level which may be due, for example, to component aging or to temperature variations.

Figure 2:
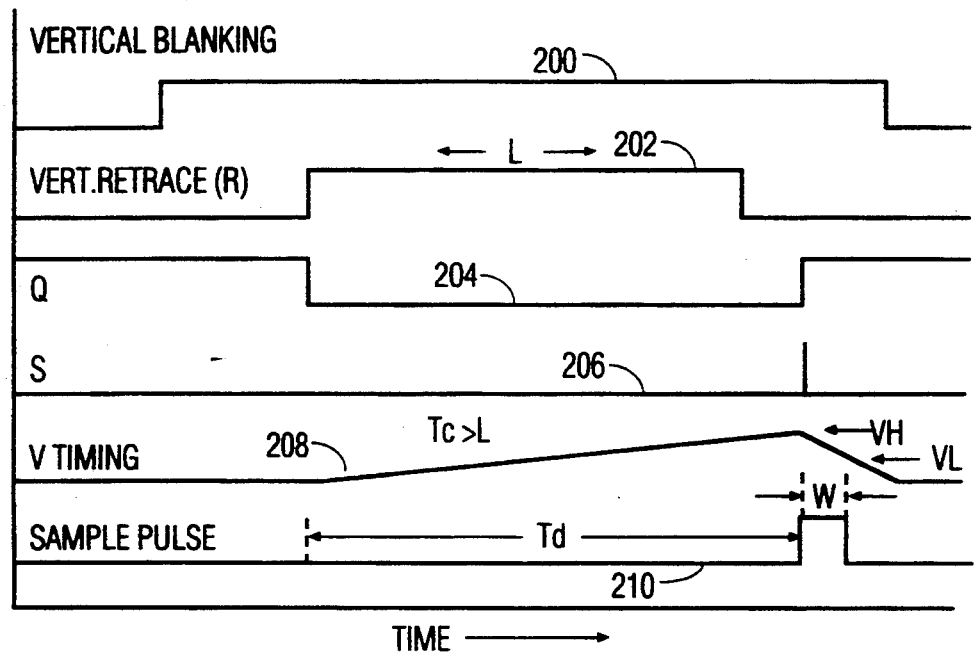
FIGS. 2 and 3 are timing diagrams illustrating operation of the sample pulse generator of FIG. 1 for two values of a selected RC time constant associated with the sample pulse generator.
Figure 3:
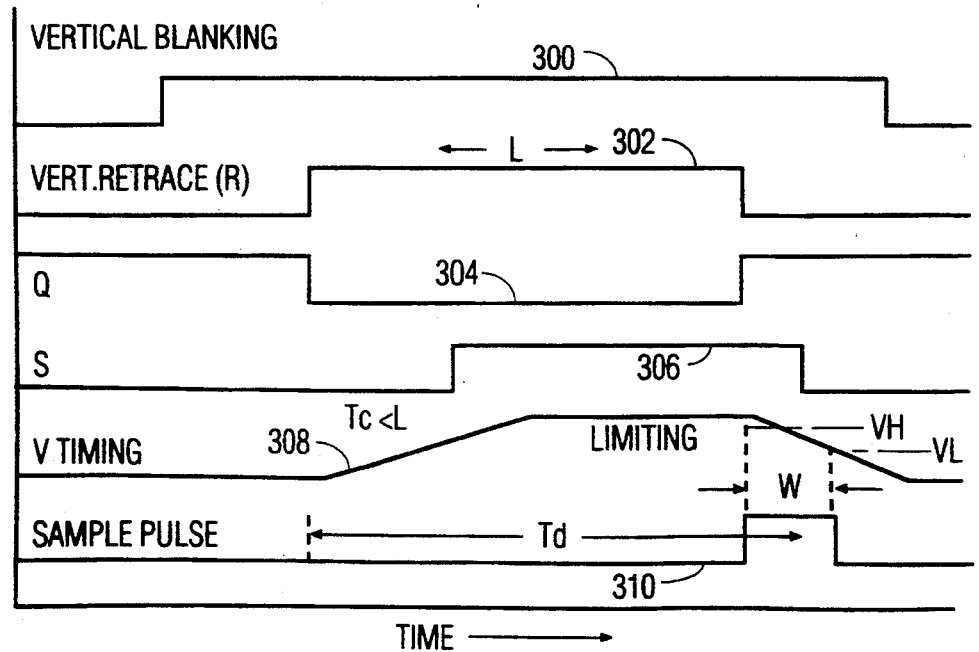

Timing or sampling pulses SP for switch 54 and keyed comparator amplifier 50 are produced by sample pulse generator 60 (outlined in phantom). This circuit is coupled to pin 4 of integrated circuit 42 for receiving a vertical retrace pulse having a given pulse length L. FIGS. 2 and 3 illustrate the timing of the vertical retrace pulse (202 in FIG. 2 or 302 in FIG. 3) with respect to the vertical blanking signal (200 in FIG. 2 or 300 in FIG. 3) provided by video processing and matrix unit 20. An RC (resistance capacitance) timing network 80 is coupled to pin 5 of the integrated circuit 40. The network comprises a resistor 84 coupled between pin 5 and a source of supply voltage +Vcc and a capacitor 82 coupled between pin 5 and a source of reference potential (e.g., ground). Exemplary values for these elements are 6.8 k-Ohms and 0.033 micro-Farads, respectively. These values are selected to provide a time constant (Tc) for the RC network that is less than the pulse length (L) of the vertical retrace pulse for reasons that will be discussed later.

The remainder of generator 60 includes a pulse forming network (62,64,66,68,70 and 72) that is coupled to pins 4 and 5 for providing the AKB sample pulse SP with a fixed delay time (Td) relative to initiation of the retrace pulse and independent of the time constant of the RC timing network and having a width (W) controlled by the RC time constant.

More specifically, unit 60 provides the function of enabling charging of the capacitor 82 upon initiation of the retrace pulse, for initiating discharging of the capacitor in response to termination of the retrace pulse and for concurrently producing the AKB output sampling pulse SP having a width (W) determined by the RC time constant and having a delay time (Td) relative to initiation of the retrace pulse that is equal to the length (L) of the retrace pulse and is independent of the value of the RC time constant.

The circuit implementation of sample pulse generator 60 includes first (68) and second (66) threshold detectors, each having a first (+) input coupled to the capacitor 20 (via pin 5), coupled also to a charging source (resistor 84) and coupled to a discharge source which here comprises a current source 70 coupled to ground via a switch 72. The magnitude of the current provided by source 70 is selected to be greater than the maximum current that can be provided by resistor 84 to capacitor 82 to ensure that when switch 72 is closed the capacitor will lose charge faster than it accumulates it and so the capacitor voltage will decrease.

Each of the detectors 66 and 68 includes a second input (−) coupled to a respective reference voltage source to receive respective reference voltages VL and VH, wherein the voltage VL applied to detector 66 is lower than the voltage VH applied to detector 68. Generator 60 also includes a flip-flop 62 having a reset input R coupled to pin 4 for receiving the vertical reset pulses, having a set input S coupled to an output of the first detector 68 and having a Q or true output coupled to a control input of the switch 72. A two input gate (AND) 64 is provided having a first input coupled to an output of the second detector 66 and having a second input coupled to the Q output of flip-flop 62 and having an output coupled to supply the sample pulse SP to the three AKB control loops 42 of integrated circuit 40.

Importantly, the charging source for capacitor 82 comprises a resistor 84 having a value selected with respect to the value of the capacitor to provide an RC time constant Tc that is shorter than the pulse length (L) of the vertical retrace pulse. The reason for this choice is dramatically illustrated by a comparison of FIGS. 2 and 3. FIG. 2 illustrates operation of the sample pulse generator under the assumption that the RC time constant is longer than the pulse length L of the vertical retrace pulse 202. FIG. 3 illustrate operation for the desired condition wherein the RC time constant is shorter than the pulse length L of the vertical retrace pulse. As will be explained, in the former case, both the time delay Td and the pulse width W of the sample pulse undesirably depend upon the RC timing elements. However, in the latter case (FIG. 3) the time delay Td does not depend at all on the RC timing elements. Advantageously, overall timing accuracy is improved since the delay time will always coincide exactly with the end of the vertical retrace signal. Because of this, for a given overscan, one may increase the width W of the sample pulse as compared with systems where both Td and W dependent on RC timing elements. This provides greater regulation accuracy for the correction current due to the greater pulse integration time and ensures also that pulse width errors are quite unlikely to appear outside the blanking interval. This advantage results because the delay time Td is much greater than the pulse width and since Td is independent of RC product, variations in the RC product will be unlikely even under the worst case conditions of moving any portion of pulse SP into the unblanked time interval.

The foregoing will now be illustrated by two examples of circuit operation, one with an assumed RC time constant that is long relative to the retrace pulse length L (e.g., as in FIG. 2) and another assuming that the time constant is shorter than L (e.g., as in FIG. 3) For the former case, reference will be made to FIG. 2. Waveform 200 illustrates the vertical blanking interval of the video signal being processed. Waveform 202 illustrates the vertical retrace pulse R having a length L that is produced by processor 20. As shown, the positive transition of 202 applies a reset to flip flop 62 causing its Q (true) output to go low. Concurrently, resetting of flip flop 62 causes switch 72, the capacitor discharge switch, to open thereby enabling charging of capacitor 82. Waveform 208 illustrates the capacitor charging cycle. When the capacitor voltage equals the high threshold value VH, detector 68 will supply a set pulse to the set input S of flip flop 62 as shown by waveform 208. Concurrently, the set condition of flip flop 62 and the high output produced by comparator 66 will enable gate 64 thus producing the sample pulse SP as shown by waveform 210. At that time switch 72 will close thereby discharging capacitor 82. When the capacitor voltage reaches VL the detector 66 will disable gate 64 thereby terminating the pulse SP. Accordingly, for this assumed condition of RC>Tl, both the time delay Td and the pulse width W of the sample pulse SP are determined by the RC time constants involved.

FIG. 3 illustrates the dramatic difference that occurs when the RC time constant is selected to be less than the length L of the retrace pulse (RC<L). As will be seen, even though nothing other than the time constant value has been changed, the circuit operation is quite different resulting in a pulse SP having a delay that does not depend upon the RC time constant.

More specifically, in FIG. 3 the beginning of the voltage ramp 308 for capacitor 82 begins at the same time as in the previous example. However, since the time constant is much shorter than previously assumed, the high threshold detector 68 is activated much earlier and the voltage exceeds VH and even goes into a limiting condition. The application of a SET input to the flip flop 62 however, has no effect on it because the retrace signal is still high at the time the output of detector 68 goes high and the reset input over rides the set input. Thus, nothing happens at this time until the reset input is removed from flip flop 62 by termination of the vertical retrace signal. The flip flop is instantly set at termination of the retrace signal because the set terminal was high at the time the retrace (reset) signal R is removed. This enables AND gate 64 and simultaneously closes switch 72 beginning the discharge cycle for capacitor 82. When the pin 5 voltage reaches the low voltage reference level VL, detector 66 disables gate 64 thereby terminating the sample pulse SP. Capacitor 82 will continue to discharge until the next vertical retrace signal is received. Accordingly, for this condition (RC<L) it has been shown that the pulse delay timing is independent of the RC product and thus not affected by variations in the component values as might be caused, for example, by temperature, aging or humidity effects. Moreover, even though the vertical retrace pulse itself may vary, the pulse position of the sample pulse will track, so to speak, variations in the vertical retrace pulse and it is the relative timing which is of importance. Thus, selection of RC<L provides the further advantage of the sample pulse exhibiting a tracking relationship with the vertical retrace pulse.

What is claimed is:

1. An AKB sample pulse generator, comprising:
   first and second threshold detectors, each having a first input coupled to a capacitor, coupled to a charging source and coupled to a discharge source, each detector having a second input coupled to a respective reference voltage source;
   a first logic element having a first control input coupled to a source of vertical retrace pulses, having a second control input coupled to an output of said first detector and having an output coupled to a control input of said discharge source;
   a second logic element having a first control input coupled to an output of said second detector and having a second control input coupled to said output of said first logic element, and having an output for providing an AKB sample pulse; and wherein:
   said charging source comprises a resistor selected with said capacitor to provide an RC time constant (Tc) that is shorter than the pulse length (L) of said vertical retrace pulse.

2. An AKB sample pulse generator as recited in claim 1 wherein said threshold detectors, said logic elements and said discharge source are formed in an integrated circuit; and wherein
   said charging source and said capacitor comprise discrete components external to said integrated circuit.

3. An AKB sample pulse generator, comprising:
   first and second threshold detectors, each having a first input coupled to a capacitor, coupled to a charging source and coupled to a discharge source, each detector having a second input coupled to a respective reference voltage source;
   a flip-flop having a first control input coupled to a source of vertical retrace pulses, having a second control input coupled to an output of said first detector and having an output coupled to a control input of said discharge source;
   a two input gate having a first input coupled to an output of said second detector, having a second input coupled to said output of said flip-flop, and having an output for providing an AKB sample output pulse; and wherein:
   said charging source comprises a resistor selected with said capacitor to provide an RC time constant (Tc) that is shorter than the pulse length (L) of said vertical retrace pulse.

4. An AKB sample pulse generator (60) as recited in claim 3 wherein said threshold detectors (66, 68), said flip-flop (62) and said two-input gate (64) and said discharge source (70,72) are formed within an integrated circuit (40); and wherein
   said charging source (84) and said capacitor (82) comprise discrete components external to said integrated circuit.

* * * * *